(No Model.)
S. I. LARKINS.
DRAFT EQUALIZER.
No. 512,039. Patented Jan. 2, 1894.
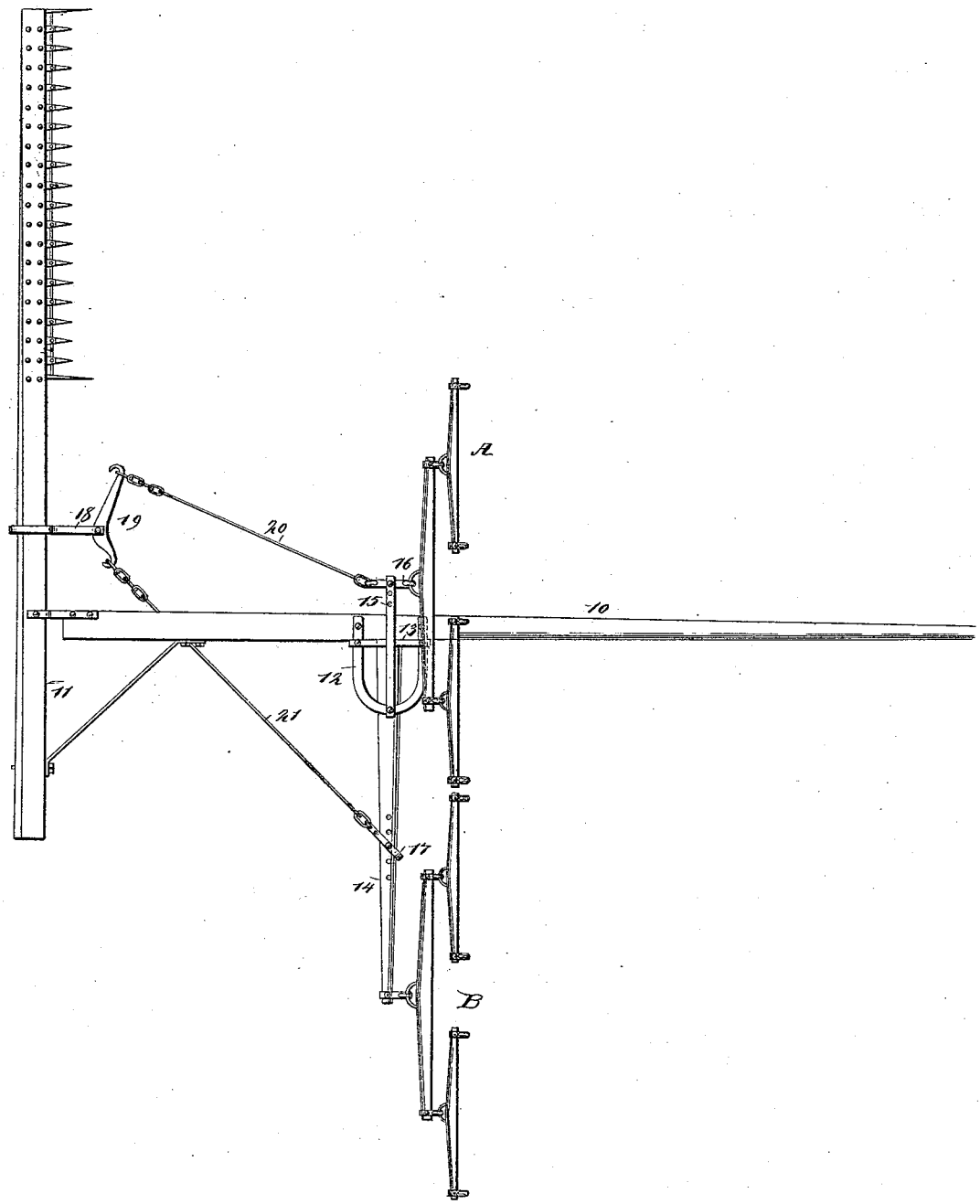
WITNESSES:
John A. Rennie
C. Sedgwick
INVENTOR
S. I. Larkins
BY
Munn & Co
ATTORNEYS.

UNITED STATES PATENT OFFICE.

SAMUEL I. LARKINS, OF MURRAY, IOWA.

DRAFT-EQUALIZER.

SPECIFICATION forming part of Letters Patent No. 512,039, dated January 2, 1894.

Application filed May 20, 1893. Serial No. 474,858. (No model.)

*To all whom it may concern:*

Be it known that I, SAMUEL I. LARKINS, of Murray, in the county of Clarke and State of Iowa, have invented a new and useful Improvement in Draft-Equalizers, of which the following is a full, clear, and exact description.

My invention relates to an improvement in draft equalizers, and the object of the invention is to provide a simple, durable and economic device, whereby a perfect equalization of the draft upon a four-horse team will be obtained, three of the horses being located at one side of the pole and the fourth at the opposite side.

A further object of the invention is to provide an equalizer capable of being especially used in connection with reapers and harvesters for example, and which will prevent side draft and will carry forward to that end any character of load.

The invention consists in the novel construction and combination of the several parts, as will be hereinafter fully set forth and pointed out in the claims.

Reference is to be had to the accompanying drawing, forming a part of this specification, which represents a plan view of the equalizer connected with the sickle bar of a reaper or mower.

Although I have illustrated the equalizer as applied to a reaper or mower, it will be understood that it is equally applicable to any form of vehicle or machine where an equalizer for a four-horse team, in which the team must be unevenly divided, is required.

In the accompanying drawing the tongue 10, is connected in any suitable or approved manner with the sickle bar 11 of a reaper or mower; and at the point upon the tongue where the equalizer would be usually applied, a double iron or clevis 12, is rigidly secured to the tongue, the clevis or arch extending at a right angle to the tongue beyond the side opposed to that at which the sickle is located. The arch or clevis, is provided with an attached transverse guide bar 13, located adjacent to the tongue, and the said arch or clevis 12, receives one end of a span or draw bar 14, the span or draw bar being preferably located at the central portion of the clevis, the inner end of the span or draw bar being located in engagement with the cross bar 13.

The equalizing bar 15 is pivoted upon the same bolt employed to attach the span or draw bar to the clevis; and the equalizing bar extends over the tongue and beyond the side opposite that beyond which the clevis extends. The equalizing bar has adjustably connected with its free end a double hook 16; and a clamp 17, is adjustably and pivotally connected with the span or draw bar between its center and its outer end. One double-tree A, is connected with the forward end of the double hook 16 in such manner that one of its single-trees will be at the right and the other at the left of the tongue, while a second double-tree B, is connected in any suitable or approved manner to the outer end of the span or draw bar.

A clevis 18, is attached to the sickle bar at that side of the pole near which the double hook 16, is located, and an evener 19, is pivotally secured to the forward end of the clevis, the said evener comprising a bar pivoted to the clevis at one side of its center, the longer end extending in direction of the sickle and the shorter end in direction of the pole. Each end of the evener is provided with a hook, and the evener is of somewhat angular construction, as it extends outwardly and forwardly from each side of its pivot point. A link 20, has a swivel connection with the longer end of the evener and with the rear portion of the double hook 16, while the shorter end of the evener is in similar connection with a second link 21, which is connected with the clamp or yoke 17 adjustably connected with the span or draw bar.

It will be observed that in this form of equalizer a perfect equalization of draft is obtained, and that the single horse at one side of the tongue will not have more work to do than any of the other three horses at the opposite side; and that the adjustment of the leverage of the single horse may be obtained by moving the double hook 16 and yoke 17 closer to or far<sup>,</sup> .er away from the tongue 10.

Having thus described my invention, I claim as new and desire to secure by Letters Patent—

1. In a draft equalizer, the combination, with a tongue adapted to be attached to the vehicle or machine to be drawn, and a span bar projected from one side of the tongue, the said span bar carrying at its outer end a double-tree, of an equalizing bar pivotally attached over the span bar and extending beyond the opposite side of the tongue, a double-tree attached to the free end of the equalizing bar, the singletrees whereof are located at opposite sides of the tongue, an evener located at one side of the tongue and pivotally connected with the vehicle or machine to be drawn, a link located at the same side of the tongue as the evener, and connecting with said evener and with the free end of the equalizing bar, and a second link connected with that end of the evener adjacent to the tongue, crossing the tongue, and connected with the span bar at about the center of the latter, substantially as described.

2. In a draft equalizer, the combination, with a sickle bar or other article to be drawn, a tongue connected with the sickle bar, and a span bar projected from one side of the tongue, supporting said span bar, of an equalizing bar pivoted to the bracket over the span bar and extending beyond the opposite side of the tongue, a double tree adjustably attached to the free end of the equalizing bar, a single-tree whereof is located at each side of the tongue, a second double-tree attached to the outer end of the span bar, an evener located at one side of the tongue and pivotally connected at one side of its center with the sickle bar or other support, a link connecting the longer end of the evener ranging at one side of the tongue and connecting with the free end of the equalizing bar and its double-tree, the attachment being an adjustable one, and a second link adjustably connecting the shorter end of the evener crossing to the opposite side of the tongue and connecting with the span bar, substantially as and for the purpose set forth.

SAMUEL I. LARKINS.

Witnesses:
T. W. HUGHEN,
F. H. BISHOP.